Patented May 22, 1951

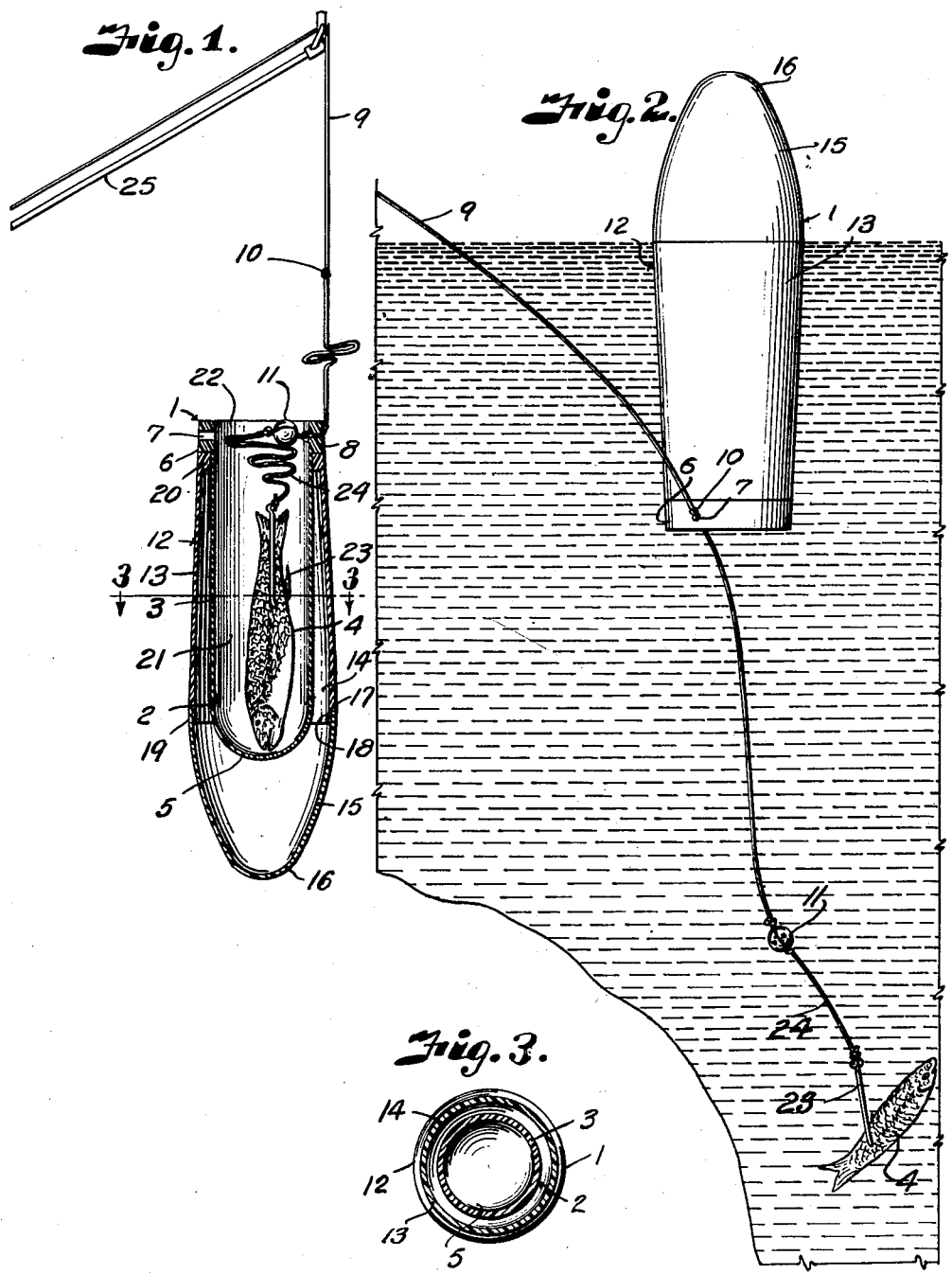

2,554,318

UNITED STATES PATENT OFFICE 2,554,318

BAIT CASTING FLOAT

James J. Wardrip, Eureka, and Riley D. Woodson, Kansas City, Kans.

Application October 18, 1946, Serial No. 704,168

2 Claims. (Cl. 43—41.2)

This invention relates to a bait casting float and more particularly to a device for a live fish lure used in fishing.

The principal object of the invention is to provide protection for the lure during casting thereof so that the lure is not injured by the fish hook or impact due to inertia or when striking the water.

Other objects of the invention are to provide a fish lure protector that also serves as a float to regulate the depth of the lure in the water; to provide a fish lure protector adapted to be filled with water which serves to distribute shock on the lure when the device strikes the water; to provide a protector for live lures whereby live lures can be cast with the accuracy and efficiency of artificial lures; and to provide a lure protector that is of streamlined shape so as to contribute to low air resistance when casting.

In accomplishing these and other objects of the invention hereinafter pointed out, I have provided an improved structure, the preferred form of which is illustrated in the accompanying drawing wherein:

Fig. 1 is a section through a bait protecting casting device embodying the features of the present invention and showing support thereof by the fish line when casting.

Fig. 2 is a view showing the device serving as a float for limiting the depth of the lure and for indicating when a fish takes the lure.

Fig. 3 is a cross section on the line 3—3 of Fig. 1.

Referring more in detail to the drawings:

1 designates a bait protecting device constructed in accordance with the present invention which includes an inner preferably cylindrical member or container 2 preferably formed of plastic material of low specific gravity and which may be transparent, translucent, or suitably colored. The inner member 2 is preferably formed of a single part and has a cylindrical wall 3 of a suitable diameter and length to freely contain the lure 4 which may be a minnow as shown. One end of the container 2 is closed by an end 5 preferably of rounded form to enhance the strength thereof and to support the head of the minnow thereon when the device is suspended by the line, for example, when casting as later described. The opposite end of the cylindrical wall 3 is provided with an outwardly extending annular collar or flange 6 to give strength and provide a location for differentially sized apertures 7 and 8 located on opposite diametrical sides thereof as shown in Fig. 1. The openings extend completely through the flange portion of the container wall and may be located at an angle to facilitate passage of the fishing line 9 therethrough. The apertures are of different size so as to accommodate the size line to be used. For example, a large line may be passed through the aperture 7 while a smaller line may be passed through the aperture 8. Thus, a knot 10 may be tied in the line to limit fishing depth of the lure as later described.

The inner side of the rim provides engagement for a stop 11 which may be a sinker as shown or a knot tied in the line at a suitable distance from the knot 10 so that the lure protecting device is carried by the line when supported by the fishing pole or during casting. The inner container 2 thus described is supported within an outer shell 12 including a slightly tapered wall portion 13 that encircles the wall of the inner container in spaced relation therewith to provide an annular air space 14 therebetween and which extends from adjacent the rim-like collar 6 to adjacent the rounded end 5 where the wall is joined with a streamlined portion 15 having a rounded closed end 16 spaced a sufficient distance from the rounded closed end 5 to cooperate with the space 14 in providing a closed air chamber extending around and across the closed end of the inner container of sufficient capacity to render the device buoyant when it is used as a float. The wall 13 is preferably provided with an annular shoulder 17 to provide a reduced extension 18 over which the streamlined portion of rim 19 of the shell member 12 is telescoped and secured thereto as by fusion or cementing of the material from which the parts are formed so as to provide an air-tight joint. The smaller end of the shell is provided with an inwardly extending angular flange 20 that closely engages the circumference of the wall 3 and which abuts against the rim-like flange 6 of the inner container 2. The flanges 6 and 20 are preferably secured together by fusion of the material or use of a cement so as to completely close the air space between the inner container 2 and the outer shell 12. The inner container thus forms a compartment 21 having an open end 22 through which a fish hook 23, lure 4 and a portion of the line 24 between the hook and the sinker are inserted as shown in Fig. 1. The knot 10 is formed in the line a suitable distance from the sinker 11 to provide the desired fishing depth when the lure passes from the container.

The device is proportioned so that the open end is substantially less buoyant than the closed end so that the open end sinks in the water when the device is cast.

In using the device, the line is passed through one or the other of the apertures 7 or 8. The sinker 11 is then attached to the line a desired distance from the end thereof and the hook secured to the end of the line as in conventional practice. The fish or other lure is attached to the hook and a knot 10 is formed in the line at a desired distance from the sinker, the line being connected to a rod 25 and wound on a reel or the like (not shown). The lure 4 is attached to the hook and is inserted through the open end 22 of the inner container so that the relatively strong cartilaginous head thereof is lowermost and supported on the inner surface of the rounded end 5 in such manner that it is best able to withstand any shock transmitted through the device when the device strikes the water. If desired, the space in the inner container surrounding the minnow may be filled with water to better equalize the shocks that may be transferred when the device strikes the water during casting. In this position it is obvious that the minnow and weight are contained freely within the protecting device and that it is the device that is supported by the line as shown in Fig. 1.

The device may be cast with accuracy and range acquired in casting of artificial lures since the angler is not concerned with damage to the lure that ordinarily results while casting unprotected live lures.

When the device strikes the water the less buoyant portion, which is that containing the opening 22, sinks in the water and more buoyant end or that of the portion 15 rises in the water so that the device floats in the position shown in Fig. 2 and permits the minnow to sink by gravity through the water and swim about with comparative freedom as limited by the spacing between the sinker 11 and the knot 10.

During casting, the streamlined shape of the device contributes to very low air resistance to the flight thereof with the result of improved accuracy and distance obtained when the device is cast into the water.

It is obvious that the inertia of the minnow, weight and hook automatically keep the parts in protected condition within the container as the device decelerates during flight and until the container strikes the water. With the device coming to rest in the water it automatically assumes the position shown in Fig. 2 upon slacking of the line. The device then serves as a float to indicate when a fish takes the minnow.

After the minnow and sinker gravitate through the water, the minnow is free and able to swim about in the water and assumes a normal position to attract fish thereto. If desired, the portion of the container that floats above the water may be coated with luminous material so that it is visible in darkness.

From the foregoing it is obvious that we have provided a fish lure protective device wherewith live bait may be cast without injury and which permits the live bait to make natural movements within the water after it has been released from the inner container of the device.

What we claim and desire to secure by Letters Patent is:

1. A casting float including an inner container having a cylindrical wall provided with a closed end and an open end adapted for supporting a lure, including a portion of a casting line to which the lure is attached, an outer shell having a wall portion spaced from and encircling the cylindrical wall of the inner container and fixed about the open end of the inner container, and having a closed end spaced from the closed end of the inner container to provide a closed chamber extending around and across the closed end of the inner container to render said float buoyant with the open end of the inner container in submergency when the float is cast into the water and the lure is released through said open end of the inner container, one of said containers having an apertured portion remote from the closed chamber through which the line is passed, said apertured portion being adapted to be engaged by a stop on the line for securing the lure to the float.

2. A lure protecting device adapted to be cast on a line to which a lure is attached including a substantially cylindrical member closed at one end and having a flange encircling an open opposite end of said member, and an outer shell having a closed end of larger diameter than the cylinder member and having a wall tapering inwardly from said closed end in spaced relation to and completely surrounding the inner member, said tapering wall being provided with an inwardly extending flange forming an opening into which the cylindrical member is closely engaged to maintain coaxial relation of said members and having an end face in abutting contact with the flange of said cylindrical member to maintain said space between the closed end of the outer shell and the closed end of the cylinder member in forming a closed air space surrounding the major portion of the cylindrical member to float said device when the device is cast into water, said cylindrical member having an aperture therein adjacent said open end through which the line may be passed.

JAMES J. WARDRIP.
RILEY D. WOODSON.

REFERENCES CITED

The following references are of record in the file of this patent:

UNITED STATES PATENTS

| Number | Name | Date |
|---|---|---|
| 763,437 | Sobey | June 28, 1904 |
| 1,128,205 | White | Feb. 9, 1915 |
| 1,193,684 | Gregory | Aug. 8, 1916 |
| 1,374,943 | Melvin | Apr. 19, 1921 |
| 1,426,402 | Moore | Aug. 22, 1922 |
| 1,707,820 | Stackelberg | Apr. 2, 1929 |
| 2,292,743 | Cordry | Aug. 11, 1942 |